United States Patent
Heinke et al.

(10) Patent No.: US 12,504,232 B2
(45) Date of Patent: Dec. 23, 2025

(54) FURNACE AND METHOD FOR OPERATING A FURNACE

(71) Applicant: INNOVATHERM PROF. DR. LEISENBERG GMBH + CO. KG, Butzbach (DE)

(72) Inventors: Frank Heinke, Weimar (DE); Detlef Maiwald, Moers (DE); Hans-Jörg Seifert, Jena (DE)

(73) Assignee: INNOVATHERM PROF. DR. LEISENBERG GMBH + CO. KG, Butzbach (DE)

( * ) Notice: Subject to any disclaimer, the term of this patent is extended or adjusted under 35 U.S.C. 154(b) by 390 days.

(21) Appl. No.: 18/024,334

(22) PCT Filed: Sep. 3, 2020

(86) PCT No.: PCT/EP2020/074647
§ 371 (c)(1),
(2) Date: Mar. 2, 2023

(87) PCT Pub. No.: WO2022/048754
PCT Pub. Date: Mar. 10, 2022

(65) Prior Publication Data
US 2024/0027133 A1 Jan. 25, 2024

(51) Int. Cl.
*F27B 13/14* (2006.01)
*F27D 19/00* (2006.01)
*F27D 21/00* (2006.01)

(52) U.S. Cl.
CPC ............. *F27B 13/14* (2013.01); *F27D 19/00* (2013.01); *F27D 21/0014* (2013.01); *F27D 2019/0018* (2013.01); *F27D 2019/0034* (2013.01)

(58) Field of Classification Search
CPC .. F27B 13/14; F27B 3/28; F27B 3/045; F27B 3/04; F27D 21/0014; F27D 19/00
See application file for complete search history.

(56) References Cited

U.S. PATENT DOCUMENTS

| 6,436,335 | B1 | 8/2002 | Leisenberg | |
|---|---|---|---|---|
| 2023/0400254 | A1* | 12/2023 | Heinke | ............... F27D 19/00 |
| 2024/0027133 | A1* | 1/2024 | Heinke | ............... F27B 13/14 |

FOREIGN PATENT DOCUMENTS

| WO | 2011027042 A1 | 3/2011 |
|---|---|---|
| WO | 2013034840 A1 | 3/2013 |
| WO | 2013044968 A1 | 4/2013 |

OTHER PUBLICATIONS

Fiot, N. et al., Successful Start-Up of Firing Control System at Vlissingen, Light Metals, 2015, pp. 1093-1096.
(Continued)

*Primary Examiner* — Ko-Wei Lin
(74) *Attorney, Agent, or Firm* — Quarles & Brady LLP; Yakov Sidorin

(57) ABSTRACT

The invention relates to a method for operating a furnace, in particular an anode furnace, the furnace being formed by a plurality of heating channels and furnace chambers, the furnace chambers serving to receive carbonaceous bodies, in particular anodes, and the heating channels serving to control the temperature of the furnace chambers, the furnace comprising at least one furnace unit, the furnace unit comprising a heating zone, a fire zone and a cooling zone, which for their part are formed by at least one section comprising furnace chambers, a suction ramp of the furnace unit being disposed in a section of the heating zone, and a burner ramp of the furnace unit being disposed in a section of the fire zone, process air in the heating channels of the fire zone being heated by means of the burner ramp, and exhaust gas being suctioned from the heating channels of the heating
(Continued)

Figure 1:
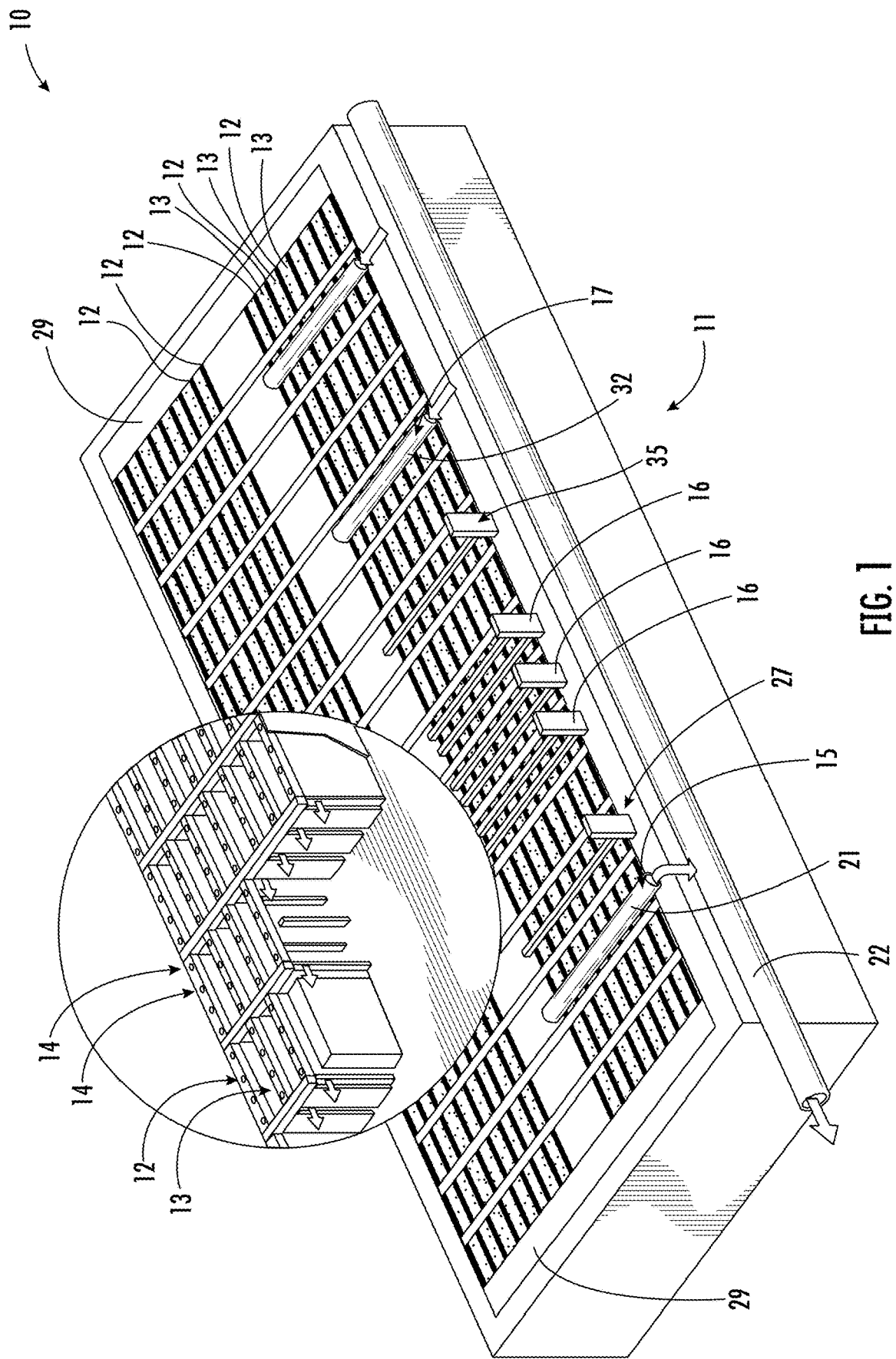

zone by means of the suction ramp, an operation of the ramps being controlled by means of a control device of the furnace unit, a temperature in the heating channel being measured in the fire zone, an output of the burner ramp being regulated according to the temperature measured in the heating channel by means of a regulator of the control device, wherein, by means of the control device, at least two characteristic numbers are determined and the characteristic numbers are compared, a status of the heating channel relative to an amount of fuel in the heating channel being determined on the basis of the comparison by means of the control device, a characteristic number including the temperature in the heating channel and/or a characteristic number including the output of the burner ramp and/or a characteristic number including a controlled variable of the regulator being determined as characteristic numbers. Furthermore, the invention relates to a control device for operating a furnace and to a furnace.

19 Claims, 3 Drawing Sheets

(56) References Cited

OTHER PUBLICATIONS

Leisenberg, W., New Tools for Supervision and Control of Open Pit Anode Bake Furnaces, Light Metals, 1998, pp. 729-732.
Leisenberg W., Flue Gas Management, Light Metals, 1999, pp. 579-584.
Mahieu, P. et al., Anode Baking Process Improvement at Alro, Light Metals, 2013, pp. 1155-1161.
European Patent Office, Notification Pursuant to Article 94 (3) EPU, Application No. 20775194.2, Mar. 14, 2024, 8 pages [No English Language Translation Available].
Mannweiler et al., Process Control In An Anode Bake Furnace Fired With Heavy Oil, Light Metals, 1991, pp. 667-671.
PCT International Search Report and Written Opinion, PCT/EP2020/074647, Mar. 16, 2021, 22 pages.

* cited by examiner

FURNACE AND METHOD FOR OPERATING A FURNACE

This patent application is a US national phase of pending International Patent Application No. PCT/EP2020/074647 filed on Sep. 3, 2020, and now published as WO 2022/048754. The disclosure of this International Patent Application is incorporated herein by reference.

The invention relates to a method for operating a furnace, in particular an anode furnace, to a control device for a furnace and to a furnace, the furnace being formed by a plurality of heating channels and furnace chambers, the furnace chambers serving to receive carbonaceous bodies, in particular anodes, and the heating channels serving to control the temperature of the furnace chambers, the furnace comprising at least one furnace unit, the furnace unit comprising a heating zone, a fire zone and a cooling zone, which for their part are formed by at least one section comprising furnace chambers, a suction ramp of the furnace unit being disposed in a section of the heating zone, and a burner ramp of the furnace unit being disposed in a section of the fire zone, process air in the heating channels of the fire zone being heated by means of the burner ramp, and exhaust gas being suctioned from the heating channels of the heating zone by means of the suction ramp, an operation of the ramps being controlled by means of a control device of the furnace unit, a temperature in the heating channel being measured in the fire zone, an output of the burner ramp being regulated according to the temperature measured in the heating channel by means of a regulator of the control device.

The present method and the device are used in producing anodes which are needed for fused-salt electrolysis for producing primary aluminum, for example. These anodes or carbonaceous bodies are produced as what is referred to as "green anodes" or "raw anodes" from petroleum coke, to which pitch is added as a binder, in a molding process, said green anodes or raw anodes being sintered in an anode furnace or furnace after molding. This sintering process takes place in a heat treatment process which runs in a defined manner and in which the anodes undergo three phases, namely a heating phase, a sintering phase and a cooling phase. In said process, the raw anodes are located in a heating zone of a "fire" formed in a furnace composed of the heating zone, a fire zone and a cooling zone and are pre-heated by the exhaust heat of previously sintered carbonaceous bodies which stems from the fire zone before the pre-heated anodes are heated to the sintering temperature of about 1200° C. in the fire zone. According to the state of the art as known from WO 2013/044968 A1, for example, the different zones mentioned are defined by an alternately continuing arrangement of different units above furnace chambers or heating channels which receive the anodes.

The fire zone, which is disposed between the heating zone and the cooling zone, is defined by the fact that a burner mechanism or one or multiple so-called burner ramps with burners is/are positioned above selected furnace chambers or heating channels. Anodes burned, i.e., heated to sintering temperature, immediately prior are located in the cooling zone. A fan or what is referred to as a cooling ramp, by means of which air is blown into the heating channels of the cooling zone, is disposed above the cooling zone. Through the heating channels, a suction mechanism or what is referred to as a suction ramp disposed above the heating zone transports the air from the cooling zone through the fire zone into the heating zone and, as waste gas or exhaust gas, from there through a waste gas cleaning system and discharges it to the environment. The suction ramp and the burner ramp form a furnace unit together with the cooling ramp and the heating channels.

The units mentioned are shifted along the heating channels in the direction of the raw anodes disposed in the furnace at regular time intervals. For instance, one furnace can comprise multiple furnace units whose units are shifted one after the other above the furnace chambers or the heating channels for subsequent heat treatment of the raw anodes or anodes. Anode furnaces of this kind, which can be configured as open or closed annular kilns in various architectures, present the problem that a discrepancy between the oxygen and the fuel in the process air can be caused within heating channels of the fire zone. Since a volumetric flow rate of process air through the heating channels cannot be influenced directly at burners of the burner ramp, an intended ratio of the oxygen and the fuel is not always achieved with a corresponding regulation. Furthermore, proper functioning of the furnace according to a desired or ideal burning curve cannot be ensured when a heating channel cover is opened or improperly closed or a heating channel is clogged or blocked, for example. Therefore, a heating channel can be flooded with too much fuel in relation to a combustion air. Such a situation is also referred to as "flooding" situation. The flooding of a heating channel with fuel first leads to high emissions and an increased energy consumption and can culminate in a dangerous operating state of the furnace which can lead to deflagrations, fires or explosions.

Hence, in practice, a check for corresponding malfunctions is carried out by trained furnace personnel in the course of a tour of the furnace and/or by evaluating status information of a process controller at regular time intervals. Moreover, a so-called "step test" can be carried out at regular time intervals. In a step test, an output of a burner or a burner ramp is slightly increased in a period of time, a temperature in the heating channel of the fire zone being measured in the period of time. If the output increase of the burner ramp does not lead to a temperature increase, the process air is already saturated with fuel or a "flooding" situation is present. In this case, it is disadvantageous that a step test can be carried out reliably only in straight heating channel portions of an annular kiln. Furthermore, a "flooding" situation can be caused by the necessary output increase of the burner ramp itself. Moreover, a step test requires a constant burner output over a longer period such that a "flooding" situation can be detected only with some delay. Furthermore, for carrying out a step test, a burner ramp cannot be operated with a maximum output initially since a sufficiently large output difference has to be present for the step test.

Hence, the object of the present invention is to propose a method for operating a furnace and a control device for a furnace by means of which an operation of the furnace can be improved.

This object is attained by a method having the features of claim 1, a control device having the features of claim 18, and a furnace having the features of claim 19.

In the method according to the invention for operating a furnace, in particular an anode furnace, the furnace is formed by a plurality of heating channels and furnace chambers, the furnace chambers serving to receive carbonaceous bodies, in particular anodes, and the heating channels serving to control the temperature of the furnace chambers, the furnace comprising at least one furnace unit, the furnace unit comprising a heating zone, a fire zone and a cooling zone, which for their part are formed by at least one section comprising furnace chambers, a suction ramp of the furnace unit being disposed in a section of the heating zone, and a burner ramp of the furnace unit being disposed in a section of the fire zone, process air in the heating channels of the fire zone being heated by means of the burner ramp, and exhaust gas being suctioned from the heating channels of the heating zone by means of the suction ramp, an operation of the ramps being controlled by means of a control device of the furnace unit, a temperature in the heating channel being measured in the fire zone, an output of the burner ramp being regulated according to the temperature measured in the heating channel by means of a regulator of the control device, wherein, by means of the control device, at least two characteristic numbers are determined and the characteristic numbers are compared, a status of the heating channel relative to an amount of fuel in the heating channel being determined on the basis of the comparison by means of the control device, a characteristic number including the temperature in the heating channel and/or a characteristic number including the output of the burner ramp and/or a characteristic number including a controlled variable of the regulator being determined as characteristic numbers.

Fuel, such as gas or oil, is typically burned by means of the burner ramp or burners of the burner ramp, preferably multiple burner ramps. In this process, an output of the burners or the burner ramp depends on an amount of fuel consumed in a time interval, wherein, by means of the regulator of the control device, the amount of fuel can be metered and, thus, the output of the burner ramp can be set. In the fire zone, the temperature in the heating channel is measured by means of measuring elements of the burner ramp, wherein the output of the burner ramp can be adjusted as a function of the temperature by means of the regulator. For this purpose, the regulator can be realized by a PID controller, for example. The regulator can be realized by a programmable logic controller or by a computer program product of the control device.

According to the invention, by means of the control device, at least two characteristic numbers may be determined and, then, the characteristic numbers may be compared once in an automated manner. In the case at hand, a characteristic number is understood to be a measured value for the quantification of a quantity to be measured or an operating condition of the furnace. The characteristic number can be an absolute characteristic number or a relative characteristic number. Depending on the result of the comparison of the characteristic numbers, a possibly present flooding of the heating channel with fuel can be inferred. For this purpose, the control device can use as a characteristic number a characteristic number which takes into account the temperature in the heating channel. The characteristic number including the temperature in the heating channel can be the temperature itself or a characteristic number which results from a mathematical calculation with the temperature. The characteristic number can also be a characteristic number including the output of the burner ramp. This can, for example, be an amount of fuel or a possible output value in percent relative to a maximum output of the burner ramp. Furthermore, the characteristic value can be a characteristic number including a controlled variable of the regulator. The controlled variable can, for example, be a target value, an actual value or a control difference or control deviation between the target value and the actual value. The control device determines at least two of these characteristic numbers by measuring and/or calculating, wherein the control device can determine on the basis of the comparison of the characteristic numbers whether an amount of fuel in the heating channel is too high. In this case, the control device does not determine an amount of the respective fuel, but only that the process air in the fire zone is saturated or supersaturated with fuel. On the basis of the comparison, a determination of an absence of fuel in the process air by means of the control device or an undersaturation is not performed.

In contrast to an inspection by furnace personnel or to a step test, the method according to the invention uses characteristic numbers which typically take certain values or are related to each other in a certain ratio when a "flooding" situation occurs. These values or ratios can be determined by an evaluation of the corresponding operating parameters of the furnace when a "flooding" situation occurs. Thus, the control device can monitor the furnace in an automated manner for a possible discrepancy between the process air and the amount of fuel without the need to carry out a step test having the disadvantages mentioned above. In this case, furthermore, critical operating conditions are determinable directly, without any lead time.

In this way, by means of the control device, the at least two characteristic numbers can be continuously determined and the characteristic numbers can be continuously compared. The characteristics can be determined by means of measuring elements and/or a mathematical calculation using a computer program product, for example. If the control device continuously determines the characteristic numbers and compares the characteristic numbers, it becomes possible to detect a "flooding" situation by means of the control device directly, without any lead time. In the case at hand, a continuous performance of the method is understood to be an uninterrupted and continual determination of characteristic numbers and their comparison. In contrast thereto, with a "step test", it is examined once if currently a "flooding" situation is present. Since a "step test" interrupts the temperature regulation, a "step test" cannot be carried out continuously.

Process air can be heated in the heating channels by means of burners of the burner ramp, wherein a regulator and a measuring element can be assigned to each burner, wherein a temperature in the heating channel can be measured by means of said measuring element, wherein, by means of the respective regulator, a respective output of the burners can be regulated according to the temperature measured with the measuring element. Consequently, a burner ramp can be realized by a plurality of burners, each burner being disposed above parallel running heating channels. One or also multiple burner(s) of the burner ramp can, thus, be assigned to each heating channel. Each of the burners can have a measuring element by means of which the temperature in the heating channel can be measured adjacent to the respective burner. Each of the burners can have a regulator which enables a regulation of the respective output of the burner according to the temperature measured with the measuring element. However, basically, it is also possible that multiple burners are assigned to one individual regulator. The regulator can be realized by a PID controller, for example.

The method can be carried out with two or more burner ramps. Consequently, the furnace can have two, preferably three or more burner ramps, which are operated in the course of the method by the control device. Thus, all burners of the furnace can be monitored with regard to a possible supersaturation of the process air with fuel.

The control device can compare the characteristic numbers determined by the control device with signs of characteristic numbers and/or characteristic numbers preset in a matrix, wherein the status of the heating channel can be determined on the basis of the comparison. For instance, a matrix or a table with specifications for the respective characteristic numbers can be stored in the control device. These can, for example, be positive or negative signs of characteristic numbers or also characteristic numbers or values which define a limit value. In this case, the control device can compare the determined characteristic numbers with the characteristic numbers in the matrix and associate the determined characteristic numbers with the characteristic numbers in the matrix. Thus, when the determined characteristic numbers essentially correspond to the characteristic numbers in the matrix, a status of the heating channel can be inferred. A status of the heating channel regarding the amount of fuel in the heating channel can be associated with each combination of characteristic numbers in the matrix. This status can be uncritical or critical, for example, and thus describe a "flooding" situation.

Furthermore, the control device can standardize a value of the respective characteristic numbers by it lying within a tolerance band stored in the control device for the respective characteristic number. Alternatively, the control device can also standardize a value of the respective characteristic numbers and take it into account only if it lies within a tolerance band stored in the control device for the respective characteristic number. The tolerance band can, for example, be realized by a maximum positive and a maximum negative value of the characteristic number and determine a range of applicability for the value. Furthermore, also two tolerance bands can be provided for a characteristic number, for example a minimum and a maximum positive value and a minimum and a maximum negative value. In this way, it can be ensured that possible negligible regulation fluctuations are not taken into account since they cannot be used for a reliable determination of a "flooding" situation. Furthermore, it can also be precluded that particularly large regulation fluctuations are influenced by a "flooding" situation since a supersaturation of the process air with fuel occurs only gradually. Accordingly, the tolerance bands can be used for the standardization of the characteristic numbers. The tolerance bands exclude those process values which are outside of the tolerance range of the tolerance band. For example, a burner output can be standardized by specifying it as a value in a range of 0% to 100%. In this case, a tolerance band can comprise the range of 5% to 100%.

The control device can determine an exceedance of a limit value for the amount of fuel in the heating channel on the basis of the comparison. An exceedance of a limit value is understood to be a supersaturation of the process air with fuel and/or a flooding of the heating channels with fuel and/or also a de-regulation of the regulator. In the case of a de-regulation, a mutual interference of regulators can be present which, due to the deviation from temperatures actually prevailing in the heating channel, leads to an incorrect regulation of adjacent burner ramps of a heating channel. An exceedance of a limit value can, for example, be determined by the control device simply based on the fact that the comparison of the characteristic numbers makes an amount of fuel in the heating channel appear to be most probably too high.

A gradient gradT of the temperature in the heating channel and/or a gradient gradY of the output of the burner ramp can be determined as characteristic numbers. The respective gradients can be compared in a matrix which is subsequently represented:

| (Matrix 1) | | | |
|---|---|---|---|
| Case | gradT | gradY (%) | Evaluation |
| 1 | + | + | no flooding |
| 2 | + | − | no flooding, possibly technical problem |
| 3 | + | 0 | no flooding, possibly technical problem |
| 4 | − | + | probably flooding |
| 5 | − | − | ambiguous, more likely no flooding |
| 6 | − | 0 | probably flooding |
| 7 | 0 | + | no flooding (other causes) |
| 8 | 0 | − | no flooding |
| 9 | 0 | 0 | no flooding and very unlikely |

As can be seen from matrix 1, a "flooding" situation can be determined for cases 4 and 6. In the other cases, it can be assumed that, for example, technical problems, such as a defective gas valve, a measuring element which is incorrectly positioned; or a normal regulating behavior are present. In cases 2 and 3, also a so-called "de-regulation" of adjacent burners can be the case. Cases 7 and 9 can, in particular in the case of a constant temperature target value, be results of the normal regulation.

A control deviation Xw of the regulator and a product Cd of control deviation Xw and a control value Y of the output of the burner ramp of the regulator can be determined as characteristic numbers. Characteristic number Cd can be determined with the following equation:

$$Cd(i,t) = x_w(i,t)|_{-100}^{+100} * Y(i,t)|_{5}^{100}/100 \text{ in } [grd\ \%] \quad \text{(Equation 1)}$$

The following parameters apply for it:
Y(t)=control value or capacity of the burner and/or the burner ramp or burner group
Xw(t)=control deviation of the regulator of the burner and/or the burner ramp or burner group (target value-actual value)

Furthermore, a tolerance band having the following limitation (in the safety device) is defined:
Control deviation Xw(t) in the range of −100 to +100 degrees
control value Y(t) in the range of 5% to 100%

The characteristic numbers are compared according to the subsequent matrix:

| (Matrix 2) | | | | |
|---|---|---|---|---|
| Case | Y(1) | Xw(t) | Cd(t) | Evaluation |
| 1 | irrelevant | 0 | 0 | steady state |
| 2 | irrelevant | + | + | regulating oscillation |
| 3 | irrelevant | − | − | regulating oscillation OR flooding |

From experience, positive signals of product Cd(t) result from a regulating oscillation and are therefore no specific signal for a "flooding" situation. Since a "flooding" situation normally generates negative control deviations, a "flooding" situation can be assumed in case 3.

A control deviation Xw of the regulator and a product Cl of control deviation Xw and a difference of a control value $Y_{i-1}$ of the output of a first burner from a control value $Y_i$ of the output of a second burner of the regulator can be determined as characteristic numbers, wherein the first burner can be disposed at a heating channel in the flow direction of the process air downstream of a second burner. In this case, the first burner and the second burner can be burners of one burner ramp or also burners of different burner ramps. Due to a backflow or a reflection of thermal energy onto a measuring element of the second burner, the first burner can cause an output reduction of the second burner by means of the regulator of the second burner. However, this output reduction requires an output increase of the first burner in order to be able to maintain a temperature in the heating channel. This mutual interference of two regulators is also referred to as "de-regulation". Characteristic number Cl can be calculated with the subsequent equation:

$$Cl(Bur_i,t)=x_w(Bur_i,t)|_{-100}^{+100}*[Y(Bur_{i-1},t)|_5^{100}-Y(Bur_i,t)|_5^{100}]/100 \text{ in } [grd \%] \quad \text{(Equation 2)}$$

The following parameter applies for it:
gradT(t)=temperature gradient of the regulator (averaged via a period of time t)
The following tolerance bands apply for this equation:
Control deviation Xw(t) in the range of −100 to +100 degrees
Control value Y(t) in the range of 5% to 100%
The characteristic numbers determined with the equation are compared with the subsequent matrix by the control device:

(Matrix 3)

| Case | BUR2: Y(t) | BUR3: Y(t) | Y(i − 1) − Y(i) | Xw(1) | Cl(1) | Evaluation |
|---|---|---|---|---|---|---|
| 1 | irrelevant | irrelevant | irrelevant | 0 | 0 | good, no feedback |
| 2 | high | very small | + | + | + | feedback |
| 3 | high | very small | + | − | − | no feedback |
| 4 | small | high | − | + | − | no feedback |
| 5 | small | high | − | − | + | no feedback |

In particular, product Cl(t) can be used for the unambiguous identification of a "de-regulation".

Consequently, the control device can determine a feedback of regulators of burners if product Cl is ≥a value of product Cl stored in the control device. It has become apparent that a "de-regulation" is always present when the product is Cl(t)=R$^+$ (e.g.: ≥2) (case 2).

A control deviation Xw of the regulator and a product Ct of control deviation Xw and a gradient gradT of the temperature in the heating channel can be determined as characteristic numbers. The characteristic numbers can be determined according to the subsequent equation:

$$Ct(i,t)=x_w(i,t)|_{-100}^{+100}*\text{gradT}(i,t)|_{-50}^{+50}/100 \text{ in } [grd^2/h] \quad \text{(Equation 3)}$$

The subsequent tolerance bands apply for these equations:
Control deviation Xw(t) in the range of −100 to +100 degrees
Gradient gradT(t) in the range of −50 to +50 degrees/h
The characteristic numbers can be compared by means of the control device according to the subsequent matrix:

(Matrix 4)

| Case | grad T(t) | Xw(t) | Ct(t) | Evaluation |
|---|---|---|---|---|
| 1 | irrelevant | 0 | 0 | good |
| 2 | + | − | − | possibly flooding+ |
| 3 | − | − | + | possibly flooding− |
| 4 | + | + | + | ambiguous |
| 5 | − | + | − | regulating oscillation |

By means of product Ct(t) it is possible to better identify different types of "flooding" situations. If multiple burners are used for one heating channel, at the first burner relative to a flow direction of the process air, always a positive temperature gradient is present, wherein, at other burners, also temperature gradients of 0 can appear. Cases 2 and 3 are unstable conditions which typically indicate a "flooding" situation.

The control device can determine the exceedance of a limit value if the fire zone spans heating channels which run straight and if the fire zone spans heating channels which run in a bending manner via a collecting channel. In particular in the case of annular kilns, at the respective ends of the annular kilns, the heating channels are diverted by typically 180° via a collecting channel of the annular kiln, said collecting channel being on the front side and all heating channels being connected to it. If the fire zone spans heating channels which run straight, all burner ramps can be disposed at the heating channels which run straight. If the fire or the fire zone moves further along the annular kiln, burner ramps can be disposed in a flow direction of the process air upstream of the collecting channel and downstream of the collecting channel such that the fire zone is realized with a change in direction. In particular, if the burner ramps are upstream of the collecting channel and the heating channels are connected to each other in the collecting channels, the process air can no longer be controlled independently. Due to pressure losses and leaks in the collecting channel, an undersupply of process air can occur in the heating channels under the burner ramps. At the same time, a high thermal output of the burner ramps is required in order to also heat the collecting channel. The significantly higher output of the burner ramp necessary for this easily causes a "flooding" situation in this area in the case of a simultaneous undersupply with process air. Therefore, due to the arrangement of a burner ramp directly upstream of the collecting channel, a control deviation of the burner ramp can occur. By means of a step test, a "flooding" situation in the area of heating channels which run in a bending manner is not detectable. Due to the fluidic short-circuit of the heating channels in the collecting channel, a detection of a "flooding" situation is not possible with a step test in the setup position of the burner ramps described above.

The control device can determine an exceedance of a limit value for the amount of fuel in the heating channel in the case of a negative temperature gradient if product Cd is smaller than a value of product Cd stored in the control device and product Ct is >0. It has become apparent that, in particular in the area of heating channels which run straight, a "flooding" situation is characterized by negative temperature gradients and increasing very high control values Y. The value of product Cd, which is stored in the control device can be =−5, for example. The characteristic number or product Cd can serve to identify unstable conditions. Due to a connection with product Cd, it is now possible to reliably identify the respective "flooding" situation in the case of negative temperature gradients.

Furthermore, the control device can determine an exceedance of a limit value for the amount of fuel in the heating channel in the case of a positive temperature gradient if product Cd is smaller than a value of product Cd stored in the control device and product Ct is ≤0. The value of product Cd, which is stored in the control device can in this case also be =−5, for example. As explained above, when setting up burner ramps directly upstream of a collecting channel or in the case of heating channels which run in a bending manner, a negative but also a positive temperature gradient can be present. In the case of a negative temperature gradient, a "flooding" situation can be unambiguously identified. In the case of a positive temperature gradient, an amount of fuel which is introduced in an unburned manner into the heating channels by a burner ramp cannot cause a cooling when it is heated via another burner ramp or burner. Such a "flooding" situation can be identified when a large negative control deviation and simultaneously a positive temperature gradient are present.

The output of the burner ramp can be adjusted by means of the control device in such a manner that a target ratio of the process air and the amount of fuel in the heating channel is reached, said target ratio being preset in the control device. The control device can increase an output of the burner ramps steadily or gradually up to a maximum if the control device does not identify a "flooding" situation. In this case, the control device can preset a maximum control value Y for the respective regulators. If the control device identifies a "flooding" situation, the control device can gradually or steadily limit or lower control values Y of the regulators of the burners. The output of the respective burner ramp is lowered until the target ratio of the process air and of the amount of fuel in the heating channel is reached and, thus, a "flooding" situation is no longer present. When the burner ramp is displaced, this ratio can be re-evaluated by means of the control device, in particular if this displacement is performed, in particular, in or out of an area of the furnace having bending heating channels.

Consequently, this adjustment can be made by lowering, increasing and/or dynamically limiting a respective output of burners of the burner ramp by means of the regulator. For example, a controlled variable of a PID controller of a burner can be limited dynamically, that is in a steadily changing manner.

The control device according to the invention is realized for operating a furnace, in particular an anode furnace, the furnace being formed by a plurality of heating channels and furnace chambers, the furnace chambers serving to receive carbonaceous bodies, in particular anodes, and the heating channels serving to control the temperature of the furnace chambers, the furnace comprising at least one furnace unit, the furnace unit comprising a heating zone, a fire zone and a cooling zone, which for their part are formed by at least one section comprising furnace chambers, a suction ramp of the furnace unit being disposed in a section of the heating zone, and a burner ramp of the furnace unit being disposed in a section of the fire zone, process air in the heating channels of the fire zone being heatable by means of the burner ramp, and exhaust gas being capable of being suctioned from the heating channels of the heating zone by means of the suction ramp, an operation of the ramps being controllable by means of the control device of the furnace unit, a temperature in the heating channel being measurable in the fire zone by means of measuring elements of the burner ramp, an output of the burner ramp being capable of being regulated according to the temperature measured in the heating channel by means of a regulator of the control device, wherein, by means of the control device, at least two characteristic numbers are determinable and the characteristic numbers are comparable, a status of the heating channel relative to an amount of fuel in the heating channel being determinable on the basis of the comparison by means of the control device, a characteristic number including the temperature in the heating channel and/or a characteristic number including the output of the burner ramp and/or a characteristic number including a controlled variable of the regulator being determinable as characteristic numbers. Regarding the advantages of the control device according to the invention, reference is made to the description of advantages of the method according to the invention. Further advantageous embodiments of a control device are apparent from the descriptions of features of the dependent claims referring back to method claim 1.

The furnace, in particular anode furnace, according to the invention comprises a control device according to the invention. Further embodiments of a furnace are apparent from the descriptions of features of the dependent claims referring back to method claim 1.

Below, a preferred embodiment of the invention is explained in more detail with reference to the accompanying drawings.

Figure 2:
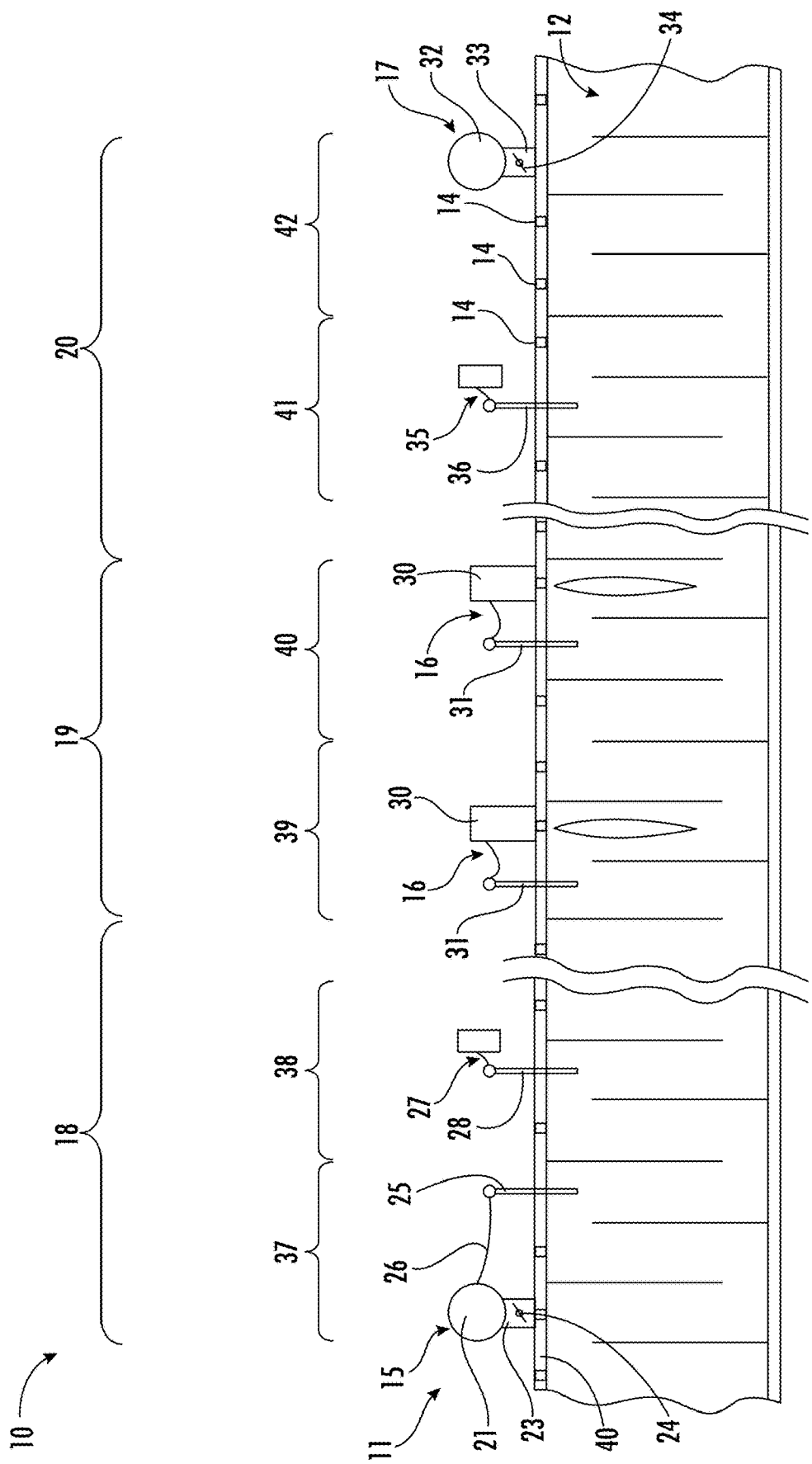
Figure 3:
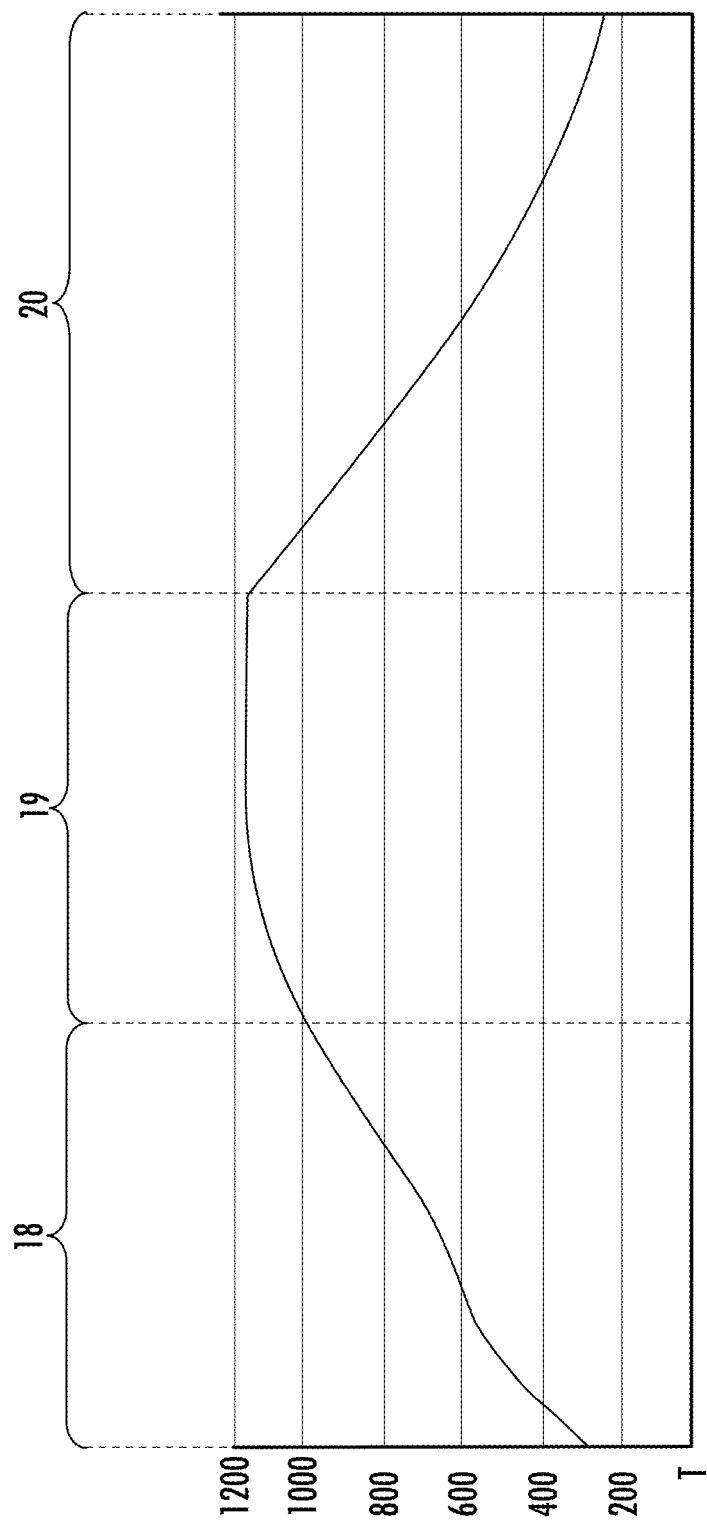

In the figures:

FIG. 1: shows a schematic illustration of a furnace in a perspective view;

FIG. 2: shows a schematic illustration of furnace unit of the furnace in a longitudinal section view;

FIG. 3: shows a temperature distribution in the furnace unit.

A combined view of FIGS. 1 and 2 shows a schematic illustration of an anode furnace or furnace 10 comprising a furnace unit 11. Furnace 10 has a plurality of heating channels 12, which extend parallel to each other along interposed furnace chambers 13. In this case, furnace chambers 13 serve to receive anodes or carbonaceous bodies (not shown in more detail). Heating channels 12 extend in a meandering shape in the longitudinal direction of furnace 10 and have heating channel openings 14 at regular intervals, which are each covered by a heating channel cover (not shown in more detail).

Furnace unit 11 further comprises a suction ramp 15, one or multiple burner ramps 16 and a cooling ramp 17. Their positions on furnace 10 functionally define a heating zone 18, a fire zone 19 and a cooling zone 20, respectively. In the course of the production process of the anodes or carbonaceous bodies, furnace unit 11 is displaced in the longitudinal direction of furnace 10 relative to furnace chambers 13 or the carbonaceous bodies by shifting suction ramp 15, burner ramps 16 and cooling ramp 17 with the result that all anodes or carbonaceous bodies located in anode furnace 10 pass through zones 18 to 20.

Suction ramp 15 is essentially formed by a suction channel 21, which is connected to an exhaust gas cleaning system (not shown in the case at hand) via an annular channel 22. Suction channel 21 for its part is connected to a heating channel opening 14 via a connecting channel 23 in each case, a throttle valve 24 being disposed on connecting channel 23 in the case at hand. Furthermore, a measuring element (not shown in the case at hand) for pressure measuring is disposed within collecting channel 21, and another measuring element 25 for temperature measuring is disposed in each heating channel 12 directly upstream of collecting channel 21 and is connected thereto via a data line 26. Moreover, a measuring ramp 27 comprising measuring elements 28 for each heating channel 12 is disposed in heating zone 18. A pressure and a temperature in the respective heating channel 12 can be determined by means of measuring ramp 27.

According to the illustration in FIG. 1, furnace unit 11 is disposed in such a manner that heating channels 12 run straight along furnace unit 11. Heating channels 12 end in collecting channels 29 of furnace 10 such that the process air flowing through heating channels 12 enters a collecting channel 29 and is, from there, again diverted into heating channels 12 when furnace unit 11 is disposed in the area of a collecting channel 29 and/or spans it. In this case, heating channels 12 run essentially in a bending manner and/or in opposite directions in the area of furnace unit 11.

10. Three burner ramps 16 comprising burners 30 and measuring elements 31 for each heating channel 12 are placed in fire zone 19. Burners 30 each burn a flammable fuel in heating channel 12, a burner temperature being measured by means of measuring element 31. This makes it possible for a desired burner temperature to be set or regulated for each of the burners 30 in the area of fire zone 19. The burner temperature is regulated by means of a regulator (not shown in the case at hand), in particular a PID controller, for each of the burners 30.

Cooling zone 20 comprises cooling ramp 17, which is formed by a feeding channel 32 comprising respective connecting channels 33 and throttle valves 34 for being connected to heating channels 12. Fresh air is blown into heating channels 12 via feeding channel 32. The fresh air cools heating channels 12 or the anodes or carbonaceous bodies located in furnace chambers 13 in the area of cooling zone 20, the fresh air continuously heating up until it reaches fire zone 19. In this context, FIG. 3 shows a diagram of the temperature distribution relative to the length of heating channel 12 and zones 18 to 20. Furthermore, a measuring ramp 35 or what is referred to as a zero pressure ramp comprising measuring elements 36 is disposed in cooling zone 20. Measuring elements 36 serve to detect a pressure in respective heating channels 12. The pressure in heating channel 12 is therefore essentially 0 in the area of measuring elements 36, a high pressure forming between measuring elements 36 and cooling ramp 17, and a low pressure forming in heating channels 12 between measuring elements 36 and suction ramp 15. Consequently, the fresh air flows from cooling ramp 17 through heating channels 12 toward suction ramp 15. Ramps 15 to 17 are each disposed in sections 37 to 42, sections 37 to 42 for their part each being formed by heating channel portions 12. Sections adjacent to sections 37 to 42 are not shown in more detail in the case at hand for the sake of clarity of FIG. 2.

During an operation of furnace 10, suction ramp 15, burner ramp 16 and cooling ramp 17 are controlled by means of a control device of furnace unit 11 (not shown in the case at hand), the control device comprising at least one means for data processing, such as a programmable logic controller or a computer, which is used to execute a computer program product or at least one software. In fire zone 19, a temperature in heating channel 12 is measured by means of the control device, an output of the burner being regulated according to the temperature measured in heating channel 12 by means of the regulators of burners 30 (also not shown in the case at hand) or the control device. The control device determines at least two characteristic numbers and compares the characteristic numbers, a status of the respective heating channel 12 relative to an amount of fuel in heating channel 12 being determined on the basis of the comparison by means of the control device. The control device uses a characteristic number including the temperature in the heating channel and/or a characteristic number including the output of burner ramp 16 or burners 30 and/or a characteristic number including a controlled variable of the regulator as characteristic numbers. The respective characteristic numbers are determined by means of the control device by measurement and/or calculation. The determination of the at least two characteristic numbers by means of the control device is carried out continuously, as is the comparison of the characteristic numbers. On the basis of the comparison, the control device determines an exceedance of a limit value for the amount of fuel in the heating channel and/or the presence of a so-called "flooding" situation.

A gradient (gradT) of the temperature in a heating channel 12 and a gradient (gradY) of the output of burner ramp 16 or burners 30 can be determined as characteristic numbers by the control device. Furthermore, a control deviation (Xw) of the regulator and a product (Cd) of the control deviation (Xw) and a control value (Y) of the output of burner ramp 16 or burners 30 of the regulator can be determined as characteristic numbers. It is also possible that a control deviation (Xw) of the regulator and a product (CI) of the control deviation (Xw) and a difference of a control value (Yi-1) of the output of a first burner 30 from a control value (Yi) of the output of a second burner 30 of the regulator are determined as characteristic numbers, first burner 30 being disposed at a heating channel 12 in a flow direction of the process air downstream of second burner 30. Moreover, the control device can determine a feedback of regulators of burners 30 if the product (Cl) is ≤a value of the product (Cl) stored in the control device. In addition, a control deviation (Xw) of the regulator and a product (Ct) of the control deviation (Xw) and a gradient (gradT) of the temperature in heating channel 12 can be determined from characteristic numbers. Due to the continuous determination of these characteristic numbers by means of the control device, it is possible to identify directly and reliably the presence of a "flooding" situation independently of a position of furnace unit 11 at heating channels 12.

The invention claimed is:

1. A method for operating a furnace that is formed by heating channels and furnace chambers, the furnace chambers configured to receive carbonaceous bodies, and the heating channels configured to control temperature of the furnace chambers, the furnace comprising at least one furnace unit,
wherein the at least one furnace unit includes a heating zone, a fire zone, and a cooling zone, each of which is formed by the furnace chambers,
wherein a suction ramp of the at least one furnace unit is disposed in the heating zone, and a burner ramp of the at least one furnace unit is disposed in the fire zone,
the method comprising:
heating process air in the heating channels of the fire zone by means of the burner ramp, and
suctioning exhaust gas from the heating channels of the heating zone by means of the suction ramp,
wherein an operation of the burner and suction ramps is controlled by means of a control device of the at least one furnace unit, a temperature in the heating channels is measured in the fire zone, an output of the burner ramp is regulated according to the temperature measured in the heating channels by means of a regulator of the control device,
and further comprising:
by means of the control device:
determining and comparing characteristic numbers, assessing, based on results of said comparing, a status of the heating channels relative to an amount of fuel in the heating channels, wherein said characteristic numbers include a characteristic number representing the temperature in the heating channels and/or a characteristic number representing the output of the burner ramp and/or a characteristic number representing a controlled variable of the regulator of the control device.

2. The method according to claim 1, wherein said determining and comparing include continuous determining and continuous comparing.

3. The method according to claim 1, wherein said heating the process air includes heating the process air in the heating channels by means of burners of the burner ramp, wherein the regulator of the control device and a measuring element are assigned to each burner, and further comprising:

measuring a temperature in the heating channels by means of said measuring element, and regulating a respective output of the burners by means of a respective regulator according to the temperature measured with the measuring element.

4. The method according to claim 1, wherein the method is carried out with the use of two or more burner ramps.

5. The method according to claim 1, comprising: with the use of the control device, further comparing the characteristic numbers determined by the control device with signs of characteristic numbers and/or characteristic numbers preset in a matrix, wherein said assessing the status of the heating channels includes determining said status based on said further comparing.

6. The method according to claim 1, comprising: with the use of the control device, standardizing a value of a respective characteristic number of said characteristic numbers when said value is within a tolerance band, the tolerance band for the respective characteristic number being stored in the control device.

7. The method according to claim 5, comprising: with the use of the control device, determining whether a limit value for the amount of fuel in the heating channels has been exceeded based on said further comparing.

8. The method according to claim 7, comprising: determining a gradient (gradT) of the temperature in the heating channels and/or a gradient (gradY) of the output of the burner ramp as said characteristic numbers.

9. The method according to claim 7, comprising: determining a control deviation (Xw) of the regulator and a product (Cd) of the control deviation (Xw) and a control value (Y) of the output of the burner ramp as said characteristic numbers.

10. The method according to claim 9, comprising: determining a control deviation (Xw) of the regulator and a product (C1) of the control deviation (Xw) and a difference of a control value ($Y_{i-1}$) of the output of a first burner from a control value (Yi) of the output of a second burner of the regulator as said characteristic numbers, wherein the first burner is disposed at the heating channels in a direction of flow of the process air downstream with respect to the second burner.

11. The method according to claim 10, comprising: determining a feedback of regulators of the first burner and the second burner if the determined product (C1) of the control deviation (Xw) is greater than or equal to a value of the product (C1) stored in the control device.

12. The method according to claim 7, comprising: determining a control deviation (Xw) of the regulator and a product (Ct) of the control deviation (Xw) and a gradient (gradT) of the temperature in the heating channels as said characteristic numbers.

13. The method according to claim 9, comprising: with the use of the control device, determining whether the limit value for the amount of fuel has been exceeded if the fire zone spans heating channels that run straight and if the fire zone spans heating channels which that run in a bending manner via a collecting channel.

14. The method according to claim 13, comprising: with the use of the control device, determining whether the limit value for the amount of fuel in the heating channel in a case of a negative temperature gradient has been exceeded if the product (Cd) of the control deviation (Xw) and the control value (Y) of the output of the burner ramp, determined as said characteristic numbers, is smaller than a value of the product (Cd) stored in the control device and the product (Ct) is greater than zero.

15. The method according to claim 12, comprising: with the use of the control device, determining whether the limit value for the amount of fuel in the heating channels in a case of a positive temperature gradient has been exceeded if a product (Cd) of the control deviation (Xw)) and a control value (Y) of the output of the burner ramp, determined as said characteristic numbers, is smaller than a value of the product (Cd) stored in the control device and the product (Ct) is smaller than or equal to zero.

16. The method according to claim 1, further comprising: adjusting the output of the burner ramp by means of the control device in such a manner as to reach a target ratio of the process air and the amount of fuel in the heating channels, wherein said target ratio is preset in the control device.

17. The method according to claim 16, wherein said adjusting the output is made by lowering, increasing, and/or dynamically limiting a respective output of burners of the burner ramp with the use of the regulator of the control device.

18. A control device configured to operate a furnace that is formed by heating channels and furnace chambers, the furnace chambers configured to receive carbonaceous bodies, and the heating channels configured to control temperature of the furnace chambers, the furnace comprising at least one furnace unit, wherein the at least one furnace unit includes a heating zone, a fire zone, and a cooling zone, each of which is formed by the furnace chambers, wherein a suction ramp of the at least one furnace unit is disposed in the heating zone, and a burner ramp of the at least one furnace unit is disposed in the fire zone, wherein the control device is configured to govern heating of process air in the heating channels of the fire zone by means of the burner ramp, to govern suctioning of exhaust gas from the heating channels of the heating zone by means of the suction ramp, to control an operation of the burner and suction ramps, to measure a temperature in the heating channels in the fire zone by means of measuring elements of the burner ramp, and to regulate an output of the burner ramp according to the temperature measured in the heating channel by means of a regulator of the control device, wherein the control device is additionally configured to determine and compare characteristic numbers and to assess a status of the heating channels relative to an amount of fuel in the heating channels on the basis of a comparison between said characteristic numbers, wherein the characteristic numbers represent the temperature in the heating channels and/or the output of the burner ramp and/or a controlled variable of the regulator.

19. A furnace comprising a control device according to claim 18.

* * * * *